No. 771,393. PATENTED OCT. 4, 1904.
W. H. REYNOLDS.
FLUID OPERATED MOTOR OR METER.
APPLICATION FILED JULY 1, 1903.
NO MODEL. 2 SHEETS—SHEET 1.
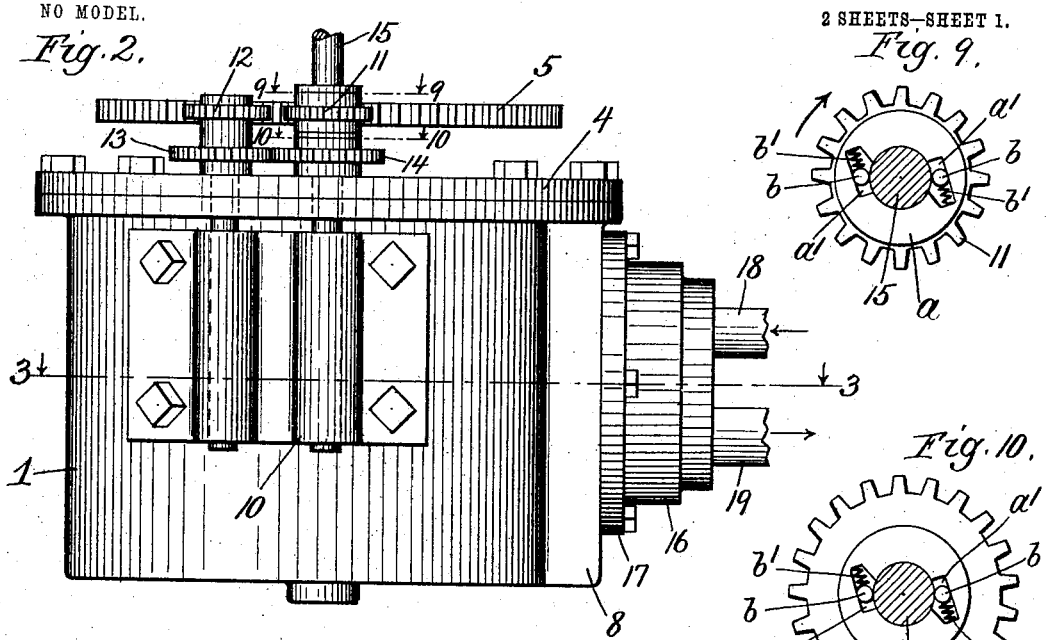

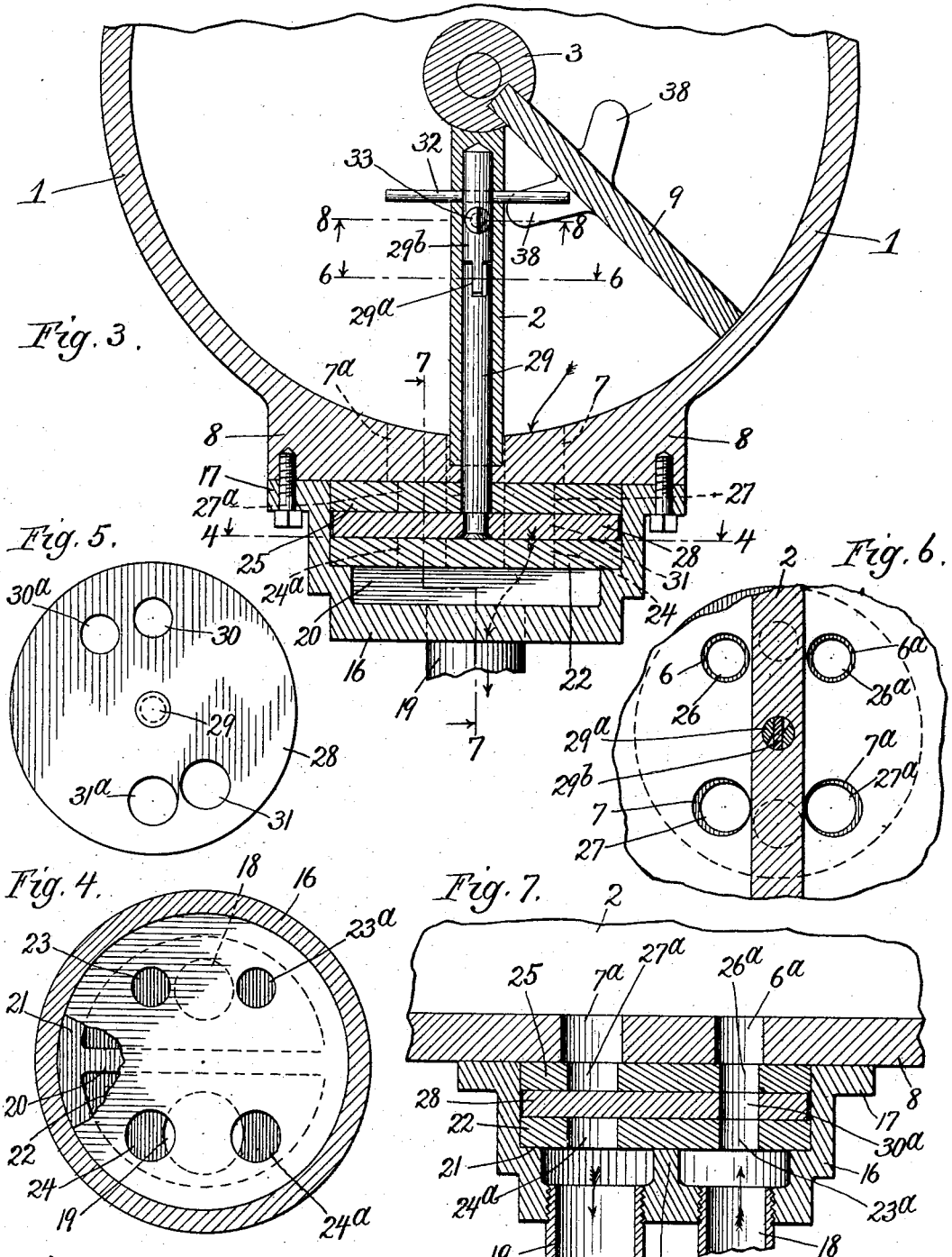

No. 771,393.                                                      Patented October 4, 1904.

UNITED STATES PATENT OFFICE.

WILLIE H. REYNOLDS, OF CHICAGO, ILLINOIS, ASSIGNOR TO M. & P. COMPANY OF CHICAGO, OF CHICAGO, ILLINOIS, A CORPORATION OF ILLINOIS.

FLUID-OPERATED MOTOR OR METER.

SPECIFICATION forming part of Letters Patent No. 771,393, dated October 4, 1904.

Application filed July 1, 1903. Serial No. 163,856. (No model.)

*To all whom it may concern:*

Be it known that I, WILLIE H. REYNOLDS, a citizen of the United States, residing at Austin, Chicago, in the county of Cook and State of Illinois, have invented new and useful Improvements in Fluid-Operated Motors or Meters, of which the following is a specification, reference being had to the accompanying drawings, forming a part thereof.

The purpose of this invention is to provide an improved device adapted to operate either as a meter or a motor operated by and measuring the flow of fluid under compression or pressure.

It consists of the features of construction which are set out in the claims.

In the drawings, Figure 1 is a top plan of my improved motor or meter. Fig. 2 is a side elevation of the same. Fig. 3 is a section at the line 3 3 on Fig. 2. Fig. 4 is a section at the line 4 4 on Fig. 3. Fig. 5 is an elevation of the valve-disk. Fig. 6 is a section at the line 6 6 on Fig. 3. Fig. 7 is a section at the line 7 7 on Fig. 3. Fig. 8 is a section at the line 8 8 on Fig. 3. Fig. 9 is a section at the line 9 9 on Fig. 2. Fig. 10 is a section at the line 10 10 on Fig. 2.

This motor comprises a cylindrical chamber 1, having a radial diaphragm 2 extending in from one side toward the center and at its inner end abutting fluid-tight against an axial shaft 3, which is stepped in the bottom of the cylindrical chamber and protrudes out through the top plate 4, above which it has rigidly secured to it a gear 5 for communicating motion, as hereinafter described, either for the purpose of power when the device is employed as a motor or for the purpose of registering the oscillations of the shaft when the device is used for a meter. The chamber has at each side of the radial diaphragm 2 an inlet-port and an outlet-port, the inlet-ports being designated 6 and 6ª, respectively, and the outlet ports 7 and 7ª. These ports open out through a boss 8, projecting from the cylindrical wall of the chamber, on which there is mounted the casing of a valve mechanism which controls the inlet and discharge of fluid.

To the shaft 3 there is rigidly secured a diaphragm 9, which is adapted to operate pistonwise in the cylindrical chamber as the shaft oscillates, carrying said piston-diaphragm from one side of the fixed diaphragm 2 around to the opposite side of said diaphragm. The construction of the valves which control the inlet and discharge of the fluid being calculated, as hereinafter explained, to thus oscillate the diaphragm and it being necessary to convert such oscillating movement into rotary movement of the motor or registering train-shaft, I provide for such conversion of motion by mounting fixedly with respect to the entire motor-case—as, for example, in a bracket 10, rigid with the motor-case—two pinions 11 and 12, both intermeshing with the gear 5, the pinion 12 having rigid with it a gear 13, which intermeshes with a gear 14 on the shaft 15 of the pinion 11. The pinion 11 and gear 14 are clutched to the shaft 15, both clutches being adapted to drive the shaft in the same direction and to permit the pinions to idle about the shaft when rotating in reverse direction. The specific construction of these clutches is not material; but a convenient form for the purpose is illustrated in Figs. 9 and 10, in which the shaft itself is the inner element, the gear constituting the outer element and being for that purpose provided with pockets $a'$, in which are lodged clutch-rolls $b$, which are held thrust into the narrow end of the pockets by springs $b'$, so that when the gear rotates in one direction the rolls are wedged between the inclined sides of the pockets and the shaft, and when it rotates in the other direction they are freed from such wedging and roll freely around the shaft without engagement therewith. It will be seen that with this structure the rotary movement of the gear 5 in one direction will drive the shaft 15 directly through the pinion 11, clutching said shaft, while the pinion 12, also rotating in the same direction as the pinion 11, by the same movement of the gear 5 will give to the gear 14 a rotary movement in the reverse direction from that communicated to the shaft through the pinion 11 and cause it to idle thereabout and that when the movement of the gear 5 is reversed the pinion 11 will in like manner idle about the shaft, while the gear 14 will be clutched to it and continue the rotation of the shaft in the same direction as at first.

The construction of the valve by which the fluid is admitted and discharged alternately at opposite sides of the piston-diaphragm will now be described.

The case 16 comprises a flange 17, which is adapted to be applied facewise to the end of the boss 8 and to make a water-tight seat thereon. At the outer side the casing 16 has connections for an inlet-pipe 18 and an outlet or discharge pipe 19, one above the other, and said casing has an interiorly-projecting rib 20, extending diametrically across the cavity between the inlet and the outlet. Seated water-tight on this rib and on an annular seat 21 is a disk 22, having apertures 23 and $23^a$ above and 24 and $24^a$ below the plane of the rib 20. Seating on the outer face of the boss 8, within the casing 16, there is a disk 25, constituting a valve-seat and having apertures 26 and $26^a$ at the upper part and 27 and $27^a$ at the lower part, corresponding to and registering with the inlet-ports 6 $6^a$ and 7 $7^a$, respectively, and also corresponding to and in line directly with the ports 23 $23^a$ and 24 $24^a$ of the disk 22. Between the disks 22 and 25, both of which may be considered valve-seats, there is a disk-valve 28, having a stem 29, which penetrates the disk 25 and extends on and into the diaphragm 2, the latter being bored to receive and afford a substantially water-tight bearing for such stem. The disk-valve 28 has inlet-ports 30 and $30^a$ for coöperation with the ports 23 $23^a$ and 26 $26^a$ of said disk-seats respectively. The inlet-ports 30 $30^a$ and likewise the outlet-ports 31 $31^a$ are half as far apart as the ports 23 $23^a$, 26 $26^a$, 24 $24^a$, and 27 $27^a$, so that when the disk-valve is rocked with its stem to cause, for example, its port $30^a$ to register with the ports 23 and 26 and its diagonally opposite port 31 to register with the ports $24^a$ and $27^a$ the other port of the upper pair, 30, stands between the two ports 23 $23^a$ of the disk-seat 22 and between the ports 26 $26^a$ of the other seat, and is thereby closed at both ends, and likewise the other port of the lower pair, $31^a$, stands between the ports 24 and $24^a$ of the seat 22 and between the ports 27 $27^a$ of the opposite disk-seat, and is thereby closed at both ends, and that in such position the inlet is in communication with the motor-chamber at one side of the diaphragm 2, and the outlet is in communication at the opposite side of said diaphragm, and to reverse communication and bring the port $30^a$ into position registered with the ports $23^a$ and $26^a$ and the port 31 of the valve in position registered with the ports 24 and 27 of the seats will require an angular movement of the valve only half the distance between the two ports of the several pairs in said seats. This is of importance, inasmuch as the distance between the ports at opposite sides of the diaphragm 2 is necessarily enough to accommodate the necessary thickness of said diaphragm and to afford adequate diameter for the ports, and it is nevertheless necessary that the shifting should be made as nearly instantaneous as possible and that for this purpose the movement of the valve to effect such shifting should be the shortest possible. For the purpose of rocking the valve with inappreciable loss of time from one position to the other for reversing the fluid connections, so as not to cause any sensible interruption of the flow of the fluid the stem 29 is jointed at $29^a$, the inner portion $29^b$ being connected to the outer by a joint, (shown in Figs. 3 and 6,) which permits one portion of the stem to rock through a considerable angle without rocking the other portion. Near the inner end of the diaphragm 2 the inner portion of the stem $29^b$ has rigid with it a cross-head 32, which is inserted through the diaphragm for penetrating said stem, the diaphragm being apertured for that purpose. The stem $29^b$ has set fast into it at its upper side a V-shaped projection 33, which extends up into a bore 34, made in the diaphragm 2 from the top, and in said bore there is lodged a short plunger 35, having its lower end preferably obtusely V-shaped to bear upon the upper end V-shaped projection 33. Above the plunger a spring 36 is retained in the bore by a plug 37 in the top of the latter, which may be screwed down thereinto to apply any necessary tension to the spring to cause it to perform the function which will be now described. It will be noticed that the plunger being pressed by the spring down upon the V-shaped projection 33 will tend to rock the valve-stem in one direction or the other, according as it presses from one side or the other of the apex of said projection, and that this tendency is increased by the ends of the plunger being also slightly beveled or tapered, making it obtusely V-shaped, as shown, and if the cross-head 32 is engaged at the end which is at a given time tilted down and is lifted up at that end until the apex of the V-shaped projection passes the direct line of pressure exerted by the spring toward the axis of the stem $29^b$ or until said apex passes the apex of the plunger the action of the spring will tend to complete the rocking of the shaft in the same direction to the opposite limit. The diaphragm 9 has projecting from opposite sides cam projections 38 38, which engage under the end of the cross-head at the side which is tilted down and crowd that end upward as the diaphragm 9 swings in toward the fixed diaphragm 2. The proportions and relations of the coacting surfaces of the parts are calculated to cause the cross-head to be rocked up to and just past horizontal position, carrying the apex of the projection 33 past the apex of the plunger by the time the diaphragm 9 has reached the point at which its action should be reversed, and at this point the action of the plunger under the pressure of the spring will with a quick movement complete the rocking of the stem necessary to reverse the position of the valve-disk 28 to reverse the fluid connections, as described, so as to admit the fluid on the side of the fixed diaphragm which the piston-diaphgram has been approaching and from which the discharge has been occurring up to that point and to open the ports for outlet at the side at which the fluid has up to that point been obtaining inlet. The rocking movement of the cross-head and of the inner portion 29$^b$ of the valve-stem caused by the engagement of the cam projection 38 of the piston-diaphragm 9 with the cross-head 32 will be calculated to correspond to the play between the two parts 29 29$^b$ at the joint 29$^a$, so that when the portion of the rocking action which is caused in the quick manner described by the action of the spring and plunger will occur after said play is taken up, and the outer portion 29 of the stem will be thereby rocked and will carry the valve through an angle corresponding to the instantaneous or quick portion of the action, and this action will be performed similarly in reverse directions at the conclusion of each movement of the diaphragm 9 in each direction as it approaches the diaphragm 2 alternately from opposite sides.

It will be seen upon inspection that the relation between the distance which separates the two inlet-ports and the two outlet-ports of the valve 28 and the corresponding distance between the inlet-ports and between the outlet-ports of the disks between which said valve is seated is not necessarily that the ports of the valve are nearer together than the ports of the disks, but that the distance between the valve-ports differs from the distance between the disk-ports by an amount sufficient to carry a port of the valve from the position registering with a corresponding port of the disks fully out of such registration—that is to say, a distance equal to the width of the ports of the direction of oscillation of the valve, whether the valve-ports are nearer together by this distance than the disk-ports or farther apart by like distance—may be determined by convenience of construction in other respects.

It will be understood that the disk 25 is merely a mechanical convenience for forming a seat for the valve, which may be well finished, and that such disk is in effect merely a facing-plate and the ports through it are to be considered as the inlet and outlet ports of the chamber itself, and except when expressly specified for the purpose of the convenience in construction indicated this disk is not distinguished from the integral body of the cylindrical chamber, and inlet and outlet ports of said chamber when mentioned in the claims are to be understood as including such inlet and outlet ports when formed through such disk as well as when formed in the substance of the chamber in the absence of the disk.

I claim—

1. A fluid motor or meter comprising a cylindrical chamber having a fixed radial diaphragm; an axial shaft in said chamber abutting on the inner end of said diaphragm, and having connected with it for oscillation in the chamber a diaphragm operating pistonwise therein, the chamber having at each side of the fixed diaphragm an inlet and an outlet port; valve devices for controlling the inlet and outlet to admit and discharge fluid alternately at opposite sides of said fixed diaphragm; a gear rigid with the axial shaft outside the chamber; a shaft having two gears clutched thereto for rotation in one direction and idling in the opposite direction, one of said gears being meshed directly with said gear on the motor-shaft, and an intermediate gear connecting the other with the first-mentioned gear on the motor-shaft.

2. A fluid motor or meter comprising a cylindrical chamber having a rigid, radial diaphragm and an oscillating diaphragm operating pistonwise in the chamber; the chamber having an inlet and an outlet at each side of the rigid diaphragm; a disk-valve mounted in position to oscillate over said ports, and having two ports for inlet and two ports for outlet, the inlet-ports being separated by a distance which differs from the distance between the inlet-ports of the chamber by an amount not less than the width of said ports in the direction of oscillation of the valve, and the outlet-ports being separated by a distance similarly related to the distance between the outlet-ports of the chamber, and means operated by the oscillating diaphragm for oscillating the valve.

3. A fluid motor or meter comprising a cylindrical chamber having a fixed radial diaphragm and an oscillating diaphragm operating pistonwise in the chamber, said chamber having at each side of the fixed diaphragm both an inlet and an outlet port; a disk-valve mounted in position to oscillate over said ports for opening and closing them, having two ports for inlet and two ports for outlet, the inlet-ports being separated a distance differing from the distance between the inlet-ports of the chamber by an amount not less than the width of the ports in the direction of oscillation of the valve, the outlet-ports of the valve being similarly related to the outlet-ports of the chamber, the valve having a stem which extends into the fixed diaphragm; a cross-head on said stem protruding from the diaphragm; a joint at some point between the cross-head and the valve having play to permit the rocking of the cross-head without oscillating the valve; means on the oscillating diaphragm for engaging the opposite ends of the cross-head as said oscillating diaphragm approaches the fixed diaphragm from opposite sides respectively, and means operating on the stem at the side of the joint toward the cross-head for rocking it to the limit in the direction after it has been positively rocked to the limit of the play of said joint.

4. A fluid motor or meter comprising a cylindrical chamber having a fixed radial diaphragm and an oscillating diaphragm operating pistonwise in the chamber, said chamber having at each side of the fixed diaphragm both an inlet and an outlet port; a disk-valve mounted in position to oscillate over said ports for opening and closing them, having two ports for inlet and two ports for outlet, the inlet-ports being separated a distance differing from the distance between the inlet-ports of the chamber by an amount not less than the width of the ports in the direction of oscillation of the valve, the outlet-ports of the valve being similarly related to the outlet-ports of the chamber, the valve having a stem which extends into the fixed diaphragm; a cross-head on said stem protruding from the diaphragm; a joint at some point between the cross-head and the valve having play to permit the rocking of the cross-head without oscillating the valve; means on the oscillating diaphragm for engaging the opposite ends of the cross-head as said oscillating diaphragm approaches the fixed diaphragm from opposite sides respectively; a projection extending from the valve-stem beyond the joint toward the cross-head, and a spring disposed in position to exert stress upon said projection toward the axis of the stem, whereby said spring completes the rocking of the stem from the position at which the point of application of the pressure of the spring on the projection has passed the line of pressure of the spring toward the axis.

5. A fluid motor or meter comprising a cylindrical chamber having a fixed radial diaphragm and an oscillating diaphragm operating pistonwise in the chamber, said chamber having at each side of the fixed diaphragm both an inlet and an outlet port; a disk-valve mounted in position to oscillate over said ports for opening and closing them, having two ports for inlet and two ports for outlet, the inlet-ports being separated a distance differing from the distance between the inlet-ports of the chamber by an amount not less than the width of the ports in the direction of oscillation of the valve, the outlet-ports of the valve being similarly related to the outlet-ports of the chamber, the valve having a stem which extends into the fixed diaphragm; a cross-head on said stem protruding from the diaphragm; a joint at some point between the cross-head, and the valve having play to permit the rocking of the cross-head without oscillating the valve; means on the oscillating diaphragm for engaging the opposite ends of the cross-head as said oscillating diaphragm approaches the fixed diaphragm from opposite sides respectively; the stem having between the joint and the cross-head a V-shaped projection; a plunger lodged in the fixed diaphragm and guided therein toward the axis of the valve-stem and bearing against said V-shaped projection, and a spring operating on the plunger to force it toward the stem to complete the rocking of the stem when the apex of the V-shaped projection passes the line of thrust of the plunger.

6. A fluid motor or meter comprising a cylindrical chamber having a fixed radial diaphragm and an oscillating diaphragm operating pistonwise therein, the chamber having at each side of the fixed diaphragm both an inlet and an outlet port; a disk through which such ports are formed; a valve-chamber mounted outside the cylindrical chamber encompassing said ports and having inlet and outlet connections and an interior rib separating the same; a disk seated in said chamber and on said separating-rib to inclose at opposite sides of the rib, inlet and outlet chambers, said disk having ports in line respectively with the said inlet and outlet ports, and a disk-valve mounted for oscillation about its axis, between and seated at opposite sides on the said similarly-ported disks, said valve having two inlet-ports and two outlet-ports corresponding to the inlet and outlet ports respectively of said ported disks, the inlet-ports of said disk-valve being separated by a distance differing from the distance between said inlet-ports of said disks by an amount as great as the width of said ports respectively, in the direction of oscillation of the valve, and the opposite ports thereof being similarly related to the outlet-ports of said disks, and means operated by the oscillating diaphragm for oscillating said valve said distance at each oscillation of the diaphragm.

In testimony whereof I have hereunto set my hand, in the presence of two witnesses, this 27th day of June, A. D. 1903.

WILLIE H. REYNOLDS.

In presence of—
  FREDK. G. FISCHER,
  J. S. ABBOTT.